United States Patent
Kihara et al.

(10) Patent No.: US 6,239,188 B1
(45) Date of Patent: May 29, 2001

(54) URETHANE MOLDED PRODUCTS FOR POLISHING PAD AND METHOD FOR MAKING SAME

(75) Inventors: Katushi Kihara; Yoshimi Mochizuki, both of Touyo (JP)

(73) Assignee: Fuji Spinning Co., Ltd., Tokyo (JP)

( * ) Notice: Subject to any disclaimer, the term of this patent is extended or adjusted under 35 U.S.C. 154(b) by 0 days.

(21) Appl. No.: 09/368,363

(22) Filed: Aug. 5, 1999

(30) Foreign Application Priority Data

Jun. 4, 1999 (JP) ................................. 11-157419

(51) Int. Cl.$^7$ .................................... C08G 18/10
(52) U.S. Cl. ........................... 521/159; 521/56; 521/137; 521/155; 521/170; 521/174
(58) Field of Search ..................... 521/155, 159, 521/170, 174, 56, 137; 524/871

(56) References Cited

U.S. PATENT DOCUMENTS 5,578,362  11/1996  Reinhardt .............................. 428/147
5,688,860 * 11/1997  Croft ..................................... 521/76

FOREIGN PATENT DOCUMENTS

| 57-137323 | 8/1982 | (JP) . |
| 6458475 | 3/1989 | (JP) . |
| 8500622 | 1/1996 | (JP) . |

* cited by examiner

*Primary Examiner*—John M. Cooney, Jr.
(74) *Attorney, Agent, or Firm*—Birch, Stewart, Kolasch & Birch, LLP

(57) ABSTRACT

Urethane molded products for polishing pad comprise two types of cells having different sizes in a urethane molded products formed by mixing and curing an isocyanate-terminated urethane prepolymer and an active hydrogen-containing compound. The molded products may be made by procedure comprising mixing expanded microballoons having a size of 10 to 50 $\mu$m and expanded microballoons having a size of 80 to 100 $\mu$m with the prepolymer and active hydrogen-containing compound and curing the mixture.

5 Claims, No Drawings

URETHANE MOLDED PRODUCTS FOR POLISHING PAD AND METHOD FOR MAKING SAME

BACKGROUND OF THE INVENTION

1. Field of the Invention

This invention relates to method for making urethane molded products for polishing pad which are provided for polishing articles to be polished such as semiconductor devices, and also to urethane molded products for polishing pad.

2. Description of the Prior Art

Polishing pads used for semiconductor devices and glasses are known, including those pads of the porous non-woven fabric type obtained by applying a polyurethane solution to a non-woven fabric as set out in Japanese Laid-open Patent No. 64-58475 and of the foamed polyurethane type which is obtained by wet molding of a polyurethane solution. Both types of pads have a structure which is provided with cellular holes on the surface thereof, and thus, are a good property of holding an article to be polished at the time of polishing and are able to favorably retain a supplied grain solution (polishing slurry) therein. However, these pads are disadvantageous in that they are too soft to cause compressive deformation on use, poor in flatness of the surface of a polished article obtained by polishing, and short in life of the polishing pad.

In recent years, as semiconductor devices are highly integrated, an interconnection pattern on a substrate is more densified, under which there is a strong demand for flatness on a substrate surface as influencing the transfer of a pattern. In order to provide a more flattened wafer surface of a semiconductor substrate, there has been adopted a chemical mechanical polishing process (abbreviated as CMP process) wherein a chemical function and a mechanical function are combined. It has been demanded to develop a polishing pad which is suitably applicable to such CMP process.

For instance, Japanese Laid-open Patent No. Hei 8-500622 discloses a polishing pad which comprises a plurality of polymeric fine elements, such as expanded microballoons, in a polyurethane matrix. The pad has a high surface hardness, so that it is more unlikely to cause compressive deformation than such a non-woven or foamed polyurethane-type polishing pad as mentioned above, thereby ensuring a high polishing rate and a good flatness. However, only one type of the expanded microballoons are mentioned as the polymeric fine elements used. When used as a polishing pad, the cells derived from the microballoons are allowed to open at the surface of the polishing pad, and abrasive grains are held at the opened cells to ensure high polishing rate. Nevertheless, a good flatness of a polished article can not be obtained by this prior invention in which only one type of the microballoons is used.

BRIEF SUMMARY OF THE INVENTION

An object of this invention is to provide urethane molded products for use as polishing pads. The urethane molded products of the present invention comprise two type of expanded microballoons having different sizes uniformly dispersed in and throughout the urethane molded products, whereby polishing pads obtained by slicing the urethane molded products are improved in polishing characteristics. Moreover, in accordance with the present invention, variation of polishing characteristics among polishing pads is small.

According to the present invention, there is provided method for making urethane molded products for polishing pad, which comprises adding expanded microballons (C) having a size of 10 to 50 $\mu$m and expanded microballoons (D) having a size of 80 to 100 $\mu$m to an isocyanate-terminated urethane prepolymer (A) and an active hydrogen-containing compound (B) in a total amount of 0.1 to 20 parts by weight per 100 parts by weight, in total, of said isocyanate-terminated urethane prepolymer (A) and said active hydrogen-containing compound (B), and mixing the resultant mixture, wherein said expanded microballoons (C) having a size of 10 to 50 $\mu$m and/or said expanded microballoons (D) having a size of 80 to 100 $\mu$m is pre-mixed with said isocyanate-terminated urethane prepolymer (A) and/or said active hydrogen-containing compound (B). It Is preferred that the mixing ratio by weight of said expanded microballoons (C) having a size of 10 to 50 $\mu$m and said expanded microballoons (D) having a size of 80 to 100 $\mu$m is in the range of 1:0.5 to 2.0. The active hydrogen-containing compound (B) should preferably consists of a diamine compound (B-1) or a mixture of the diamine compound (B-1) and a diol (B-2) having a molecular weight of 500 to 1000. The urethane molded products for polishing pad obtained according to the present invention includes 0.1 to 20 parts by weight, in total, of expanded microballoons (C) having a size of 10 to 50 $\mu$m and microballoons (D) having a size of 80 to 100 $\mu$m per 100 parts by weight of urethane molded product.

DETAILED DESCRIPTION OF THE INVENTION

As disclosed in Japanese Laid-open Patent No. Sho 57-137323 and the like, the two types of the expanded microballoons having different sizes (C) and (D) used in the present invention are obtained by thermal expansion of non-expanded, thermally expandable microspheres which individually have a low boiling hydrocarbon, such as, for example, isobutane, pentane, isopentane, petroleum ether or the like, at a center thereof and a shell encapsulating the hydrocarbon therein and made of a thermoplastic resin such as, for example, an acrylonitrile-vinylidene chloride copolymer, an acrylonitrile-methyl methacrylate copolymer, a vinyl chloride-ethylene copolymer or the like. When heated, the low boiling hydrocarbon existing at the center of each microsphere is vaporized and gasified to cause the shell portion to be softened thereby providing a microballoon having a gas encapsulated therein.

In the present invention, two types of microballoons having different sizes are used. The expanded microballoons (C) having a size of 10 to 50 $\mu$m are obtained by expanding non-expanded, thermally expandable microspheres having a smaller size. Likewise, non-expanded, thermally expandable microspheres having a larger size are expanded to obtain expanded microballoons (D) having a size of 80 to 100 $\mu$m. Of these two types of microballoons, the expanded microballoons (C) having a smaller size contribute to the improvement in flatness of articles to be polished when applied as the polishing pad. The expanded microballoons (D) having a larger size contributes to the improvement in polishing rate of articles to be polished when applied as the polishing pad. In order to achieve an improved flatness of articles to be polished and an improved polishing rate by use of two types of microballoons having different sizes, it is necessary to control a mixing ratio between these two types of microballoons as will be described later. A preferred combination consists of the expanded microballoons (C) having a size of 10 to 50 $\mu$m and the expanded microballoons (D) having a size of 80 to 100 μm. If the size of the expanded microballoons (C) is smaller than 10 μm, a polishing effect is not shown. On the other hand, when the size is larger than 50 μm, such microballoons are likely to contribute to the improvement of the polishing rate, but the effect of improving the flatness of articles to be polished unfavorably lowers. Moreover, when the expanded microballoons (D) have a size smaller than 80 μm, the polishing rate is not effectively improved. In contrast, when the size is larger than 100 μm, physical properties of the resultant polishing pad unfavorably lower.

The isocyanate-terminated urethane prepolymer (A) used in the invention is a reaction product obtained from a polyol or a mixture of a polyol and a low molecular weight diol and an organic diisocyanate compound under ordinarily employed reaction conditions. Examples of the organic diisocyanate compound include 2,4-tolylene diisocyanate, 2,6-tolylene diisocyanate, 4,4'-diphenylmethane diisocyanate, naphthalene-1,5-diisocyanate, tolidine diisocyanate, para-phenylene diisocyanate, xylylene diisocyanate, isophorone diisocyanate and the like. These may be used singly or in combination of two or more.

The polyol for reaction with an organic diisocyanate compound include, for example, polyether polyols such as poly(oxytetramethylene)glycol, poly(oxypropylene)glycol and the like, polycarbonate polyols, polyester polyols, and the like.

As the polyol, there may be used mixtures of low molecular weight diols such as, for example, ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol and the like.

The active hydrogen-containing compound (B) used to polymerization reaction of the isocyanate-terminated urethane prepolymer (A) include, for example, diamine compound (B-1) such as 3,3'-dichloro-4,4'-diaminodiphenylmethane, chloroaniline-modified dichlorodiaminodiphenylmethane, 3,5-bis(methylthio)-2,4-toluenediamine, 3,5-bis(methylthio)-2,6-toluenediamine and the like. Moreover, the active hydrogen-containing compound (B) include, aside from the above-indicated diamine compound (B-1), their mixtures with low molecular weight diol (B-2) having a molecular weight in the range of 500 to 1000 such as, for example, polyether glycols such as poly(oxytetramethylene)glycol, poly(oxypropylene)glycol and the like, polycarbonate glycols, polyester glycols and the like.

The expanded microballoons (C) having a size of 10 to 50 μm and/or the expanded microballoons (D) having a size of 80 to 100 μm are added to and mixed with such an isocyanate-terminated urethane prepolymer (A) and/or active hydrogen-containing compound (B) as set out before, and are subjected to reaction.

There may be used several methods including a method wherein a dispersion of the expanded microballoons (C) having a size of 10 to 50 μm and the expanded microballoons (D) having a size of 80 to 100 μm in the isocyanate-terminated urethane prepolymer (A) is mixed with the active hydrocarbon-containing compound (B), to which neither expanded microballoons (C) having a size of 10 to 50 μm or expanded microballoons (D) having a size of 80 to 100 μm is added, a method wherein the isocyanate-terminated urethane prepolymer (A), to which neither expanded microballoons (C) having a size of 10 to 50 μm or expanded microballoons (D) having a size of 80 to 100 μm is added, is mixed with a dispersion of the expanded microballoons (C) having a size of 10 to 50 μm and the expanded microballoons (D) having a size of 80 to 100 μm in the active hydrogen-containing compound (B), a method wherein a dispersion of the expanded microballoons (C) having a size of 10 to 50 μm and the expanded microballoons (D) having a size of 80 to 100 μm in the isocyanate-terminated urethane prepolymer (A) is mixed with a dispersion of the expanded microballoons (C) having a size of 10 to 50 μm and the expanded microballoons (D) having a size of 80 to 100 μm in the active hydrogen-containing compound (B), a method wherein a dispersion of the expanded microballoons (C) having a size of 10 to 50 μm in the isocyanate-terminated urethane prepolymer (A) is mixed with a dispersion of the expanded microballoons (D) having a size of 80 to 100 μm in the active hydrogen-containing compound (B), and a method wherein a dispersion of the expanded microballoons (D) having a size of 80 to 100 μm in the isocyanate-terminated urethane prepolymer (A) is mixed with a dispersion of the expanded microballoons (C) having a size of 10 to 50 μm in the active hydrogen-containing compound (B).

A dispersion or dispersions of either or both of the expanded microballoons (C) having a size of 10 to 50 μm and the expanded microballoons (D) having a size of 80 to 100 μm in either or both of the isocyanate-terminated urethane prepolymer (A) and the active hydrogen-containing compound (B) are charged from each charge port of a mixer, respectively.

The dispersions used in the invention should preferably be kept at a temperature of about 100° C. prior to charge into a mixer.

The total amount of the expanded microballoons (C) having a size of 10 to 50 μm and the expanded microballoons (D) having a size of 80 to 100 μm is in the range of 0.1 to 20 parts by weight, preferably from 2 to 10 parts by weight, per 100 parts by weight of the total of the isocyanate-terminated urethane prepolymer (A) and the active hydrogen-containing compound (B). If the total amount is less than the above range, polishing characteristics such as the polishing rate and the flatness becomes poor. In contrast, a larger total amount unfavorably leads to the lowering of physical properties of polishing pad.

The ratio between the expanded microballoons (C) having a size of 10 to 50 μm and the expanded microballoons (D) having a size of 80 to 100 μm should preferably be 1:0.5 to 2.0. If the ratio of (D) is less than the ratio of (C): (D)=1:0.5, the polishing rate lowers. On the contrary, when the ratio of (D) is larger than the ratio of (C): (D)=1:2.0, the flatness unfavorably becomes poor.

The dispersions charged into a mixer as set out above is then charged into a mold, heated to 90 to 120° C., from the mixer and clamped, followed by primary curing at 90 to 120° C. for about 30 minutes. After removal of the mold, the molded product is placed in a heating oven in which it is subjected secondary curing at 90 to 120° C. for 5 to 20 hours.

The urethane molded product for polishing pad obtained according to this embodiment contains the expanded microballoons (C) having a size of 10 to 50 μm and the expanded microballoons (D) having a size of 80 to 100 μm in amount of 0.1 to 20 parts by weight per 100 parts by weight of the urethane molded product. Accordingly, when the urethane molded product is applied to semiconductor polishing as the polishing pad, the urethane pad is so abraded during polishing that two types of fresh cell holes invariably develop. This leads to a large amount of abrasive grains to be held on the polishing pad, thereby improving polishing characteristics such as the polishing rate and the flatness. Moreover, because the surface of the polishing pad, which is brought into contact with a surface to be polished, is invariably kept clean, there can be obtained an effect of preventing the surface to be polished from damaging.

Polishing pads can be obtained by slicing the urethane molded products into a desired thickness and cutting the resultant pieces as having a desired size. In this connection, the manner of slicing and cutting and whether or not desired grooves are formed in the surface of the polishing pad are not restricted.

The urethane molded products obtained by the method according to this embodiment has two types of expanded microballoons having different sizes dispersed therein. When the urethane molded products were sliced and cut into polishing pads for use as semiconductor polishing, a large amount of abrading grains can be retained in or on the polishing pad, thereby improving polishing characteristics such as polishing rate, flatness and the like. In addition, a variation in the polishing characteristics among the polishing pads can be remarkably reduced.

EXAMPLES

The invention is more particularly described by way of examples, which should not be construed as limitation thereof. In Examples, parts are by weight unless otherwise indicated.

The polishing characteristics described in Examples are evaluated according to the following procedures.

<Evaluation of Polishing Characteristics>
Polishing Test Conditions
  Article to be polished: $SiO_2$ film on a silicon wafer
  Loading against wafer: 5.0 psi.
  Revolutions of platen: 280 r.p.m.
  Polishing time: 60 seconds
1. Polishing Rate Ten polishing pads obtained by slicing the same urethane molded product for polishing pad were provided and subjected to a polishing test under such conditions as indicated above one by one. A polished article was subjected to measurement of a thickness (Å) at 50 points of the article per unit polishing pad after and prior to the test. An average value of the differences in the thickness after and prior to the test was calculated to provide a polishing rate per unit time. The average value X and the variance value Y are expressed as X±Y, respectively, indicating the polishing rate and the variation among polishing pads.

It will be noted that a greater value of X indicates a better polishing efficiency, and a smaller value of Y indicates a smaller variation among the polishing pads.
2. Flatness The flatness (%) of polishing pads was calculated according to the following equation using a maximum value (Max) and a minimum value (Min) of the difference in thickness of each pad after and prior to the test and an average value (Ave) of the differences in thickness based on the data of 10 pads obtained in the above test 1.

Flatness (%)={(Max−Min)/Ave}×100

The average value M and the variance value N of the flatness of ten pads are expressed by M±N, indicating the flatness and the variation among the pads, respectively.

It will be noted that a smaller value of M indicates a better flatness, and a smaller value of N indicates a smaller variation among the polishing pads.

Example 1

0.4 parts of expanded microballoons (Expancel 551 DE 20, made by Expancel Co., Ltd.), which had a size of 15 to 25 μm, whose shell was made of an acrylonitrile-vinylidene chloride copolymer and which contained an iso-butane gas therein, and 0.4 parts of expanded microballoons (Matsumoto Microspheres F-80ED, made by Matsumoto Yushi-Seiyaku Co., Ltd.), which had a size of 80 to 90 μm, whose shell was made of an acrylonitrile-vinylidene chloride copolymer and which contained an iso-butane gas therein, were added to and mixed with 1000 parts of an isocyanate-terminated urethane prepolymer, which was obtained by reaction of 770 parts of tolylene diisocyanate with a mixed glycol composed of 1000 parts of poly (oxytetramethylene) glycol and 155 parts of diethylene glycol. The resultant mixed fluid was charged into a first liquid tank and kept at 80° C. On the other hand, 238 parts of 3,3'-dichloro-4,4'-diaminodiphenylmethane used as an active hydrogen-containing compound was charged into a second liquid tank and kept at 100° C. The respective fluids in the first and second liquid tanks were charged into a mixer having two charge ports from the respective charge ports. While the two fluids were mixed under agitation, the resultant mixture was charged into a mold of a molding machine preheated to 100° C., clamped and subjected to primary curing at 110° C. for 30 minutes. The thus primary cured molded product was removed from the mold and subsequently subjected to secondary curing in an oven at 120° C. for 5 hours to obtain a urethane molded product. After the thus obtained urethane molded product was allowed to cool down to 25° C., it was sliced into 1.5 mm thick pieces to provide polishing pads as sample No. 1.

The above procedure was repeated except that the amounts of the two types of expanded microballoons were, respectively, changed to 1 part, 12 parts, 60 parts, 120 parts and 180 parts, thereby obtaining Sample Nos. 2 to 6, each consisting of 10 polishing pads.

The polishing pads of sample Nos. 1 to 6 were each set in a polishing device and subjected to a polishing test, with the results shown in Table 1.

TABLE 1

| | Amount of Expanded Microballoons (parts by weight) | | | | | |
|---|---|---|---|---|---|---|
| Sample No. | Particle Size of 10 to 50 μm (amount relative to 1000 parts of urethane prepolymer) | Particle Size of 80 to 100 (amount relative to 1000 parts of urethane prepolymer) | Total (amount relative to 1000 parts of urethane prepolymer) | Amount relative to 100 parts by weight, in total, of urethane prepolymer and active hydrogen-containing compound | Polishing Rate (Å/min) | Flatness (%) |
| 1 | 0.4 | 0.4 | 0.8 | 0.06 | 1750 ± 30 | 7 ± 2 |
| 2 | 1 | 1 | 2 | 0.16 | 1850 ± 20 | 6 ± 1 |
| 3 | 12 | 12 | 24 | 7.94 | 1860 ± 20 | 6 ± 1 |
| 4 | 60 | 60 | 120 | 9.69 | 1880 ± 20 | 6 ± 1 |
| 5 | 120 | 120 | 240 | 19.39 | 1890 ± 20 | 6 ± 2 |
| 6 | 180 | 180 | 360 | 29.08 | 1900 ± | 9 ± 3 |

TABLE 1-continued

20

According to Table 1, the polishing pads of Sample Nos. 2 to 5 of the invention are excellent in both polishing rate and flatness. However, with Sample No. 1 where the total amount of two types of expanded microballoons having different sizes is less than 0.1 part by weight relative to 100 parts by weight, in total, of the urethane prepolymer and the active hydrogen-containing compound, the flatness and polishing rate are both inferior to those of the pads of the invention. On the other hand, with Sample No. 6 where the amount is larger than 20 parts by weight, the resultant polishing pads are soft in nature and are excellent in polishing rate, but the flatness is inferior to that of the polishing pads of the invention.

Comparative Example

A mixed fluid, in which 23 parts of expanded microballoons whose shell was made of an acrylonitrile-vinylidene chloride copolymer and which contained an iso-butane gas therein and had a size of 30 to 50 $\mu$m (Expancel 551 DE, made by Expancel Co., Ltd.) was added to and mixed with 1000 parts of an isocyanate-terminated urethane prepolymer obtained by reacting 770 parts of tolylene diisocyanate with a mixed glycol of 1000 parts of poly(oxytetramethylene) glycol and 155 parts of diethylene glycol, was charged into a first liquid tank and kept at 70° C. 238 parts of 3,3'-dichloro-4,4'-diaminodiphenylmethane serving as an active hydrogen-containing compound was charged into a second liquid tank and kept at 120° C. The respective fluids in the first and second liquid tanks were charged into a mixer having two charge ports from the respective charge ports. While the two fluids were mixed under agitation in the mixer, the resultant mixture was charged into a mold of a molding machine preheated to 100° C., clamped and heated at 110° C. for 30 minutes for primary curing. The thus primary cured molded product was removed from the mold and then subjected to secondary curing at 120° C. for 5 hours in an oven to obtain a urethane molded product. After allowing to cool down to 25° C., the urethane molded product was sliced into a 1.5 mm thickness to obtain 10 polishing pads as Sample No. 7.

The polishing pads of Sample No. 7 were each set in a polishing device and subjected to a polishing test, revealing that the polishing rate was at 1810±30 (Å/minute) and the flatness was at 7±1 (%). Thus, it will be apparent that the polishing pads of Sample No. 7 wherein expanded microballoons having only one size are used according to a conventional method are inferior in both polishing rate and flatness to those pads of the invention.

Example 2

1000 parts of an isocyanate-terminated urethane prepolymer obtained in the same manner as in Example 1 was charged into a first liquid tank and kept at 80° C. A mixed fluid, which was obtained by adding two types of microballoons including 38 parts of expanded microballoons (Expancel 551 DE 20, made by Expancel Co., Ltd.) having a size of 15 to 25 $\mu$m and 20 parts of expanded microballoons (Matsumoto Microspheres F-80ED) having a size of 80 to 90 $\mu$m to 188 parts of an active hydrogen-containing compound, 3,5-bis(methylthio)-2,6-toluenediamine (Ethacure 300, made by Ethyl Corporation), was charged into a second liquid tank and kept at 70° C. Respective fluids in the first and second liquid tanks were charged into a mixer having two charge ports from the respective charge ports. While the two fluids were mixed under agitation, the resultant mixture was charged into a mold of a molding machine preheated to 100° C., clamped and subjected to primary curing at 110° C. for 30 minutes. The thus primary cured molded product was removed from the mold and subsequently subjected to secondary curing in an oven at 120° C. for 5 hours to obtain a urethane molded product. After the thus obtained urethane molded product was allowed to cool down to 25° C., it was sliced into 1.5 mm thick to provide 10 polishing pads as sample No. 8.

The polishing pads of Sample No. 8 were each set in a polishing device and subjected to a polishing test, revealing that the polishing rate was at 1900±20 (Å/minute) and the flatness was at 5±1 (%). Thus, it will be apparent that the polishing pads, which were obtained by mixing the two types of microballoons having different sizes are mixed with the active hydrogen-containing compound, unlike Example 1, not with the urethane prepolymer and slicing the resultant urethane molded product, are also excellent in polishing characteristics.

Example 3

A mixed fluid, in which 40 parts of expanded microballoons (Matsumoto Microsphere F-80ED) having a size of 80 to 90 $\mu$m was added to and mixed with 1000 parts of an isocyanate-terminated urethane prepolymer obtained by reaction of 344 parts of tolylene diisocyanate with a mixed glycol of 1000 parts of poly(oxytetramethylene) glycol and 155 parts of diethylene glycol, was charged into a first liquid tank and kept at 80° C. A mixed fluid, in which 30 parts of expanded microballoons (Matsumoto Microsphere 551 DE 20) having a size of 15 to 25 $\mu$m was added to and mixed with 334 parts of a mixed glycol of 3,5-bis(methylthio)-2, 6-toluenediamine (Ethacure 300, made by Ethyl Corporation) serving as an active hydrogen-containing compound and poly(oxytetramethylene) glycol having a molecular weight of 650, was charged into a second liquid tank and kept at 70° C. The respective fluids in the first and second liquid tanks were charged into a mixer having two charge ports from the respective charge ports. While the two fluids were mixed under agitation, the resultant mixture was charged into a mold of a molding machine preheated to 100° C., clamped and subjected to primary curing at 110° C. for 30 minutes. The thus primary cured molded product was removed from the mold and subsequently subjected to secondary curing in an oven at 120° C. for 5 hours to obtain a urethane molded product. After the thus obtained urethane molded product was allowed to cool down to 25° C., it was sliced into 1.5 mm thick to provide 10 polishing pads as sample No. 9.

The polishing pads of Sample No. 9 were each set in a polishing device and subjected to a polishing test, revealing that the polishing rate was at 1960±20 (Å/minute) and the flatness was at 6±1 (%). Thus, it will be apparent that when mixing the low molecular weight diol for use as the active hydrogen-containing compound, the resultant polishing pads had excellent polishing characteristics and a reduced variation among the polishing pads.

Example 4

A mixed fluid, in which 37 parts of expanded microballoons having a size of 15 to 25 $\mu$m (Expancel 551 DE 20) was added to and mixed with 1000 parts of an isocyanate-terminated urethane prepolymer obtained in the same manner as in Example 3, was charged into a first liquid tank and kept at 80° C. A mixed fluid, in which 30 parts of expanded microballoons having a size of 80 to 90 μm (Matsumoto Microsphere F-80 ED) was added to and mixed with a 1:1 glycol mixture of chloroaniline-modified dichlorodiaminodiphenylmethane serving as an active hydrogen-containing compound and poly(oxytetramethylene) glycol having a molecular weight of 650, was charged into a second liquid tank and kept at 70° C. The respective fluids in the first and second liquid tanks were charged into a mixer having two charge ports from the respective charge ports. While agitating the two fluids under agitation, the resultant mixture was charged into a mold of a molding machine preheated to 100° C., clamped and heated at 110° C. for 30 minutes for primary curing. The thus primary cured molded product was removed from the mold and subjected to secondary curing at 120° C. for 5 hours in an oven to obtain a urethane molded product. After allowing the urethane molded product to cool down to 25° C., the urethane molded product was sliced into a 1.5 mm thickness to provide 10 polishing pads as Sample No. 10.

The polishing pads of Sample No. 10 were each set in a polishing device and subjected to a polishing test, revealing that the polishing rate was at 1960±20 (Å/minute) and the flatness was at 6±1.5 (%). Thus, it will be apparent that the polishing pads had excellent polishing characteristics and a reduced variation among the polishing pads.

Example 5

The same procedure of Example 4 was repeated except that the amount of the expanded microballoons having a size of 80 to 90 μm (Matsumoto Microsphere F-80ED) was changed to 111, 74, 19 and 7 parts, respectively, to obtain Sample Nos. 11 to 14, each consisting of 10 polishing pads.

The polishing pads of Sample Nos. 11 to 14 were each set in a polishing device and subjected to a polishing test, with the results shown in Table 2 below.

TABLE 2

| Sample No. | Amount of Expanded Microballoons (parts by Weight) | | | | | |
|---|---|---|---|---|---|---|
| | Particle Size of 10 to 50 μm (amount relative to 1000 of urethane prepolymer) | Particle Size of 80 to 100 μm (amount relative to 432 parts of active hydrogen-containing compound) | Mixing ratio of microballoon | Amount relative to 100 parts by weight, in total, of urethane prepolymer and active hydrogen-containing Compound | Polishing Rate (Å/min) | Flatness (%) |
| 11 | 37 | 111 | 1:3 | 10.34 | 1850 ± 30 | 9 ± 2 |
| 12 | 37 | 74 | 1:2 | 7.75 | 1850 ± 20 | 6 ± 1 |
| 13 | 37 | 19 | 1:0.5 | 3.91 | 1860 ± 20 | 6 ± 1 |
| 14 | 37 | 7 | 1:0.2 | 3.07 | 1750 ± 20 | 6 ± 1 |

As will be apparent from table 2, the polishing pads of Sample Nos. 12, 13 of the invention are excellent in both polishing rate and flatness. In contrast, with Sample No. 11 wherein the amount of the microballoons is 10.34 relative to 100 parts by weight, in total, of the urethane prepolymer and the active hydrogen-containing compound but with a mixing ratio between the two types of microballoons having different sizes being at 1:3, so that the flatness becomes poor. In Sample No. 14, the amount relative to 100 parts by weight, in total, of the urethane prepolymer and the active hydrogen-containing compound is at 3.07 and the mixing ratio between the two types of microballoons having different sizes is at 1:0.2, so that the polishing rate becomes poor.

What is claimed is:

1. A method for making urethane molded products for polishing pad, which comprises adding expanded microballoons (C) having a size of 10 to 50 μm and expanded microballoons (D) having a size of 80 to 100 μm, in a weight ratio (C):(D) in the range of 1:0.5–2.0, to an isocyanate-terminated urethane prepolymer (A) and an active hydrogen-containing compound (B) in a total amount of 0.1 to 20 parts by weight per 100 parts by weight, in total, of said isocyanate-terminated urethane prepolymer (A) and said active hydrogen-containing compound (B).

2. A method for making urethane molded products for polishing pad according to claim 1, wherein said expanded microballoons (C) having a size of 10 to 50 μm and/or said expanded microballoons (D) having a size of 80 to 100 μm is pre-mixed with said isocyanate-terminated urethane prepolymer (A) and/or said active hydrogen-containing compound (B).

3. A method for making urethane molded products for polishing pad according to claim 1, wherein said active hydrogen-containing compound (B) consists of a diamine compound (B-1) or a mixture of the diamine (B-1) and a diol (B-2) having a molecular weight of 500 to 1000.

4. Urethane molded products for polishing pad which includes 0.1 to 20 parts by weight, in total, of expanded microballoons (C) having a size of 10 to 50 μm and expanded microballoons (D) having a size of 80 to 100 μm, in a weight ratio (C):(D) in the range of 1:0.5–2.0, per 100 parts by weight of said urethane molded product.

5. A method for making urethane molded products for polishing pad according to claim 2, wherein said active hydrogen-containing compound (B) consists of a diamine compound (B-1) or a mixture of the diamine (B-1) and a diol (B-2) having a molecular weight of 500 to 1000.

* * * * *